US011555931B2

(12) United States Patent
Söderholm et al.

(10) Patent No.: US 11,555,931 B2
(45) Date of Patent: Jan. 17, 2023

(54) IDENTIFYING POTENTIALLY MANIPULATED GNSS NAVIGATION DATA AT LEAST PARTIALLY BASED ON GNSS REFERENCE DATA

(71) Applicant: HERE GLOBAL B.V., Eindhoven (NL)

(72) Inventors: Stefan Söderholm, Espoo (FI); Jari Tapani Syrjärinne, Tampere (FI); Saara Kuismanen, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 84 days.

(21) Appl. No.: 17/066,753

(22) Filed: Oct. 9, 2020

(65) Prior Publication Data

US 2021/0109230 A1      Apr. 15, 2021

(30) Foreign Application Priority Data

Oct. 10, 2019   (EP) ..................................... 19202540

(51) Int. Cl.
  *G01S 19/21*      (2010.01)
  *G01S 19/07*      (2010.01)
  (Continued)

(52) U.S. Cl.
  CPC ............ *G01S 19/215* (2013.01); *G01S 19/07* (2013.01); *G01S 19/256* (2013.01); *G01S 19/21* (2013.01);
  (Continued)

(58) Field of Classification Search
  CPC ........ G01S 19/215; G01S 19/07; G01S 19/42; G01S 19/21; G01S 19/256; G01S 19/27; G01S 19/40
  (Continued)

(56) References Cited

U.S. PATENT DOCUMENTS 7,548,196 B2     6/2009   Fagan et al.
7,564,401 B1 *   7/2009   Strachan ................ H04K 3/255
                                                  342/357.29
(Continued)

FOREIGN PATENT DOCUMENTS

DE    10 2017 209594 A1    12/2018
EP          3671282 A1 *    6/2020 ............. G01S 19/21

OTHER PUBLICATIONS

"Advanced Interference Monitoring & Mitigation (AIM+)" [online] [Retrieved Oct. 26, 2020] Retrieved from the Internet: <URL:https://web.archive.org/web/20190417120526/https://www.septentrio.com/en/advanced-interference-monitoring-mitigation-aim>. (Apr. 17, 2019), 7 pages.

(Continued)

*Primary Examiner* — Chuong P Nguyen
(74) *Attorney, Agent, or Firm* — Alston & Bird LLP (57) ABSTRACT

A method, apparatus and computer readable storage medium are provided for determining whether or not GNSS navigation data are potentially manipulated. In the context of a method, GNSS reference data is received that represents one or more GNSS signals observed by a reference receiver at a reference position. The method also receives GNSS navigation data and determines, at least partially based on said GNSS reference data and the GNSS navigation data, a position estimate of said reference position. The method further includes determining, at least partially based on said reference position and the position estimate of said reference position, whether or not the GNSS navigation data are potentially manipulated.

18 Claims, 4 Drawing Sheets

(51) Int. Cl.
*G01S 19/25* (2010.01)
*G01S 19/27* (2010.01)
*G01S 19/42* (2010.01)
*G01S 19/40* (2010.01)

(52) U.S. Cl.
CPC .............. *G01S 19/27* (2013.01); *G01S 19/40* (2013.01); *G01S 19/42* (2013.01)

(58) Field of Classification Search
USPC .... 342/352, 357.59, 357.23, 357.25, 357.44, 342/357.64, 357.66
See application file for complete search history.

(56) References Cited

U.S. PATENT DOCUMENTS

| | | | |
|---|---|---|---|
| 7,940,213 B2 | 5/2011 | Harper et al. | |
| 8,624,779 B2* | 1/2014 | Ferguson | G01S 19/04 342/357.58 |
| 9,277,526 B2* | 3/2016 | Qiu | G01S 5/021 |
| 9,507,026 B2 | 11/2016 | Nichols | |
| 9,689,686 B1 | 6/2017 | Carmack et al. | |
| 10,036,813 B2* | 7/2018 | Nyikos | G01S 19/396 |
| 10,234,564 B2* | 3/2019 | Whitehead | G01S 19/215 |
| 10,408,942 B2* | 9/2019 | Kim | G01S 19/215 |
| 10,935,627 B2* | 3/2021 | Wirola | H04W 12/122 |
| 10,942,245 B2* | 3/2021 | Wirola | H04W 4/80 |
| 11,415,702 B2* | 8/2022 | Marmet | G01S 19/215 |
| 2007/0200752 A1 | 8/2007 | van Diggelen et al. | |
| 2014/0368380 A1 | 12/2014 | Revol et al. | |
| 2016/0128017 A1* | 5/2016 | Qiu | G01S 19/21 455/456.5 |
| 2016/0370469 A1* | 12/2016 | Mabuchi | G07B 15/063 |
| 2016/0370471 A1* | 12/2016 | Mabuchi | G01S 19/215 |
| 2021/0109226 A1* | 4/2021 | Syrjärinne | G01S 19/256 |
| 2021/0109229 A1* | 4/2021 | Söderholm | G01S 19/28 |
| 2021/0109231 A1* | 4/2021 | Söderholm | G01S 19/28 |

OTHER PUBLICATIONS

"Department of Defense World Geodetic System 1984, Its Definition and Relationships with Local Geodetic Systems", United States Department of Defense (Jan. 3, 2000), 175 pages.
"GNSS Anti-Spoof and Anti-Jam Solutions" [online] [Retrieved Oct. 26, 2020] Retrieved from the Internet: <URL:https://web.archive.org/web/20180819004016/http://www.qascom.com/GNSS-anti-spoof-solutions.php>. (Aug. 19, 2018), 2 pages.
"GNSS Spoofers Revealed" [online] [Retrieved Oct. 26, 2020] Retrieved from the Internet: <URL:https://web.archive.org/web/20190907113047/https://www.javad.com/jgnss/javad/news/pr20180726.html>. (Sep. 7, 2019), 7 pages.
"RAIM+: Receiver Autonomous Integrity Monitoring" [online] [Retrieved Oct. 26, 2020] Retrieved from the Internet: <URL:https://www.septentrio.com/en/raim-receiver-autonomous-integrity-monitoring#overlay-context-iono>. (2018), 3 pages.
Extended European Search Report for Application No. 19202540.1 dated Mar. 31, 2020, 6 pages.
O'Hanlon et al., "Real-Time Spoofing Detection using Correlation between Two Civil GPS Receiver", Proceedings of the 25th International Technical Meeting of the Satellite Division of The Institute of Navigation (ION GNSS 2012), (Sep. 2012), 7 pages.
Psiaki et al., "GPS Spoofing Detection via Dual-Receiver Correlation of Military Signals", IEEE Transactions on Aerospace and Electronic Systems, vol. 49, No. 4 (Oct. 2013), 15 pages.

* cited by examiner

IDENTIFYING POTENTIALLY MANIPULATED GNSS NAVIGATION DATA AT LEAST PARTIALLY BASED ON GNSS REFERENCE DATA

CROSS-REFERENCE TO RELATED APPLICATIONS

This application claims priority to European Application No. 19202540.1, filed Oct. 10, 2019, the entire contents of which are incorporated herein by reference.

The invention relates to the field of GNSS based radio positioning and more specifically to identifying potentially manipulated GNSS navigation data at least partially based on GNSS reference data.

BACKGROUND

Satellite signal based positioning technologies are based on a Global Navigation Satellite System (GNSS), such as the Global Positioning System (GPS) and/or the Galileo system.

In a GNSS system, each GNSS satellite orbiting the Earth periodically broadcasts respective GNSS navigation data. For example, the respective navigation data may be part of a message conveyed by a GNSS signal broadcasted by the respective GNSS satellite. The respective navigation data may for example contain ephemeris data that enable determining an orbital position of the respective GNSS satellite at any given time for a limited period of time. Moreover, the respective navigation data may for example contain clock data that enable determining a deviation of a clock of the respective GNSS satellite from a GNSS system time at any given time for a limited period of time. A mobile device observing GNSS signals of at least four GNSS satellites may estimate its position based on the observed GNSS signals and valid navigation data of these at least four GNSS satellits. Since the navigation data are crucial for position estimating and only valid for a limited period of time, the navigation data need to be updated at regular intervals.

GNSS systems provide open services for civilian and unauthorized users. Typically, GNSS signals broadcasted for such uses are unencrypted and cannot be authenticated which make them vulnerable to manipulation techniques like GNSS signal spoofing. Spoofing of GNSS signals may be considered to relate to a deliberate attempt to deceive a mobile device by falsifying GNSS signals structured to resemble one or more authentic GNSS signals. This may for example be done by transmitting (e.g. broadcasting) one or more manipulated GNSS signals (e.g. a GNSS signal conveying a message containing manipulated navigation data) or by retransmitting (e.g. rebroadcasting) authentic GNSS signals captured previousy (e.g. a GNSS signal conveying a message containing navigation data which are no longer valid). Such manipulation techniques are a threat to business models which rely on trustworthy positioning like car sharing services.

SUMMARY OF SOME EMBODIMENTS OF THE INVENTION

It is inter-alia an object of the present invention to improve satellite signal based positioning technologies by mitigating the threat associated with such manipulation techniques.

According to an exemplary aspect of the invention, a method performed by a mobile device is disclosed, wherein the method comprises:

- receiving GNSS reference data representing one or more GNSS signals observed by a reference receiver at a reference position;
- receiving GNSS navigation data;
- determining, at least partially based on the GNSS reference data and the GNSS navigation data, a position estimate of the reference position;
- determining, at least partially based on the reference position and the position estimate of the reference position, whether or not the GNSS navigation data are potentially manipulated.

The disclosed method may serve for identifying potentially manipulated GNSS navigation data at least partially based on GNSS reference data.

The mobile device may be a smart home device, a smartphone, a tablet computer, a notebook computer, a smart watch, and a smart band.

For example, the disclosed method may be part of a GNSS based positioning solution. The mobile device may be enabled for or support such a GNSS based positioning solution like the Galileo system or the GPS system. This may be understood to mean that the mobile device is configured to estimate its position (e.g. determine a position estimate of its position) at least partially based on one or more GNSS signals (e.g. GNSS signals reveived from at least four GNSS satellites) observed at this position and GNSS navigation data (e.g. GNSS navigation data of the at least four GNSS satellites). To this end, the mobile device may be configured for (e.g. periodically or repeatedly or continuously) scanning for GNSS signals observable at the position of the mobile device.

As disclosed above, each GNSS satellite orbiting the Earth may (e.g. periodically or repeatedly or continuously) broadcast respective GNSS navigation data. For example, each GNSS satellite orbiting the Earth may (e.g. periodically or repeatedly or continuously) broadcast a respective GNSS signal conveying a message containing the GNSS navigation data of the respective satellite (i.e. the navigation data are part of the message). Receiving GNSS navigation data may accordingly be understood to mean that the GNSS navigation data are received from a GNSS satellite or a spoofing device, for example by receiving a GNSS signal conveying a message containing the GNSS navigation data from the GNSS satellite or the spoofing device. An example of such a message is a Galileo F/NAV message as specified by the Galileo open service specifications that are presently available in the Internet under https://www.gsc-europa.eu/electronic-library/programme-reference-documents#open.

Another example for such a message is a GPS navigation message as specified by the GPS specifications that are presently available in the Internet under https://www.gps.gov/technical/.

The GNSS navigation data received by the mobile device may for example contain at least one of (1) ephemeris data that enable determining an orbital position of a GNSS satellite (e.g. the GNSS satellite from which the GNSS navigation data have been received) at a given time (e.g. for a limited period of time) and (2) clock data that enable determining a deviation of a clock of a GNSS satellite (e.g. the GNSS satellite from which the GNSS navigation data have been received) from a GNSS system time at a given time (e.g. for a limited period of time).

The reference receiver may be understood to be a stationary device (e.g. a reference station) that is fixedly located at a predetermined and/or known reference position. It is however to be understood that the invention is not limited to this and that the reference receiver may alternatively be a mobile device that is not located at a fixed reference position (i.e. the reference receiver is moveable or in motion, e.g. such that the reference position is changeable or changes).

Moreover, the reference receiver may be configured for (e.g. periodically or repeatedly or continuously) scanning for GNSS signals (e.g. observable) at the reference position of the reference receiver and for reporting GNSS reference data representing one or more GNSS signals which have been observed by the reference receiver when scanning for observable GNSS signals (e.g. at a given time). For example, the reference receiver may report the GNSS reference data by transmitting them to the mobile device or another remote device like a server. Alternatively or additionally, the reference receiver may report the GNSS reference data by broadcasting them such that they are receivebly by devices (e.g. the mobile device) that are in broadcast range of the reference receiver.

The GNSS reference data (i.e. the GNSS reference data representing one or more GNSS signals observed by the reference receiver) may be received by the mobile device from the reference receiver or from another remote device like a server.

Receiving the GNSS reference data may be understood to mean that the GNSS reference data are received via a wireless communication path. An example of such a wireless communication path is a wireless communication connection or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be mobile phone network like a 2G/3G/4G/5G cellular communication network. The 2G/3G/4G/5G cellular radio communication standards are developed by the 3GPP and presently available under http://www.3gpp.org/.

For example, a position estimate of the reference position of the reference receiver may be determined at least partially based on the GNSS reference data representing one or more GNSS signals observed by the reference receiver and the navigation data received by the mobile device. For example, the GNSS reference data may represent the one or more GNSS signals observed by the reference receiver at the reference position by containing at least GNSS observation data (e.g. representing at least one of (1) a respective time-of-arrival at the reference receiver and (2) a respective time-of-flight from the respective GNSS satellite to the reference receiver for each of the one or more GNSS signals of the respective GNSS signal).

Determining, at least partially based on the one or more GNSS signals represented by the GNSS reference data representing one or more GNSS signals observed by the reference receiver and the GNSS navigation data received by the mobile device, a position estimate of the reference position may be understood to mean that the determining depends on the GNSS reference data and the GNSS navigation data. It is however to be understood that the determining may optionally depend on further data or information. The determining may be performed according to a predetermined GNSS positioning algorithm. To give a non-limiting example, such a GNSS positioning algorithm may comprise at least one of the following steps:

determining, for each of the one or more GNSS signals, a respective pseudorange between the reference receiver and a respective GNSS satellite of one or more GNSS satellites broadcasting the respective GNSS signal of the one or more GNSS signals at least partially based on the GNSS reference data (i.e. the GNSS reference data representing one or more GNSS signals observed by the reference receiver);

determining, for each of the one or more GNSS satellites broadcasting the one or more GNSS signals, a respective orbital position (e.g. at the time-of-transmission) at least partially based on the GNSS navigation data of the respective GNSS satellite (e.g. ephemeris data contained in the GNSS navigation data received by the mobile device);

determining the position estimate of the reference position of the reference receiver at least partially based on the determined pseudorange(s) and the determined orbital position(s), for examply by solving a GNSS observation equation system at least partially based on the determined pseudorange(s) and the determined orbital position(s) (e.g. a minimum of four GNSS signals observed by the reference receiver may be necessary to solve such a GNSS observation equation system).

The position estimate of the reference position may be understood to be a representation of the reference position obtained as a result of the determining as disclosed above. It is however to be understood that the position estimate of the reference position may deviate from the real reference position (e.g. due to uncertainties like measurement errors or due to manipulation of the GNSS navigation data).

Determining, at least partially based on the reference position and the position estimate of the reference position, whether or not the GNSS navigation data (i.e. the GNSS navigation data received by the mobile device) are potentially manipulated may be understood to mean that the determining depends on the the reference position and the position estimate of the reference position. It is however to be understood that the determining may optionally depend on further data or information.

For determining whether or not the GNSS navigation data (i.e. the GNSS navigation data received by the mobile device) are potentially manipulated at least partially based on the observation position and the position estimate of the observation position, the mobile device may hold available or obtain a representation of the observation position and a representation of the position estimate of the observation position.

Therein, a position or position estimate may be represented in form of geographical coordinates like longitude and latitude of a global coordinate system, for example coordinates according to WGS-84 (World Geodetic System 1984). WGS-84 is the standard U.S. Department of Defense definition of a global reference system for geospatial information and specifies a global coordinate system. It is presently available under: http://earth-info.nga.mil/GandG/publications/tr8350.2/wgs84fin.pdf.

Moreover, a representation of a position or position estimate may be understood to be hold available by the mobile device when it is stored in a memory of the mobile device; and a representation of a position or position estimate may be understood to be obtained by the mobile device when it is received by the mobile device or when it is determined by the mobile device.

As disclosed above, the reference receiver may be a stationary device that is fixedly located at a predetermined and/or known reference position. Accordingly, the mobile device may hold available a representation of the reference position of the reference receiver. For example, if the reference receiver is part of a plurality of reference receivers, the mobile device may hold available, for each of the plurality of reference receivers, a respective representation of a respective reference position. Alternatively or additionally, the mobile device may obtain a representation of the reference position of the reference receiver, for example by receiving the representation of the reference position of the reference receiver together with the GNSS reference data.

The representation of the position estimate of the reference position may be obtained by the mobile device as a result of the above disclosed determining of the position estimate of the reference position.

The determining whether or not the GNSS navigation data (i.e. the GNSS navigation data received by the mobile device) are potentially manipulated may be performed according to predetermined rules (e.g. a predetermined algorithm). For example, the predetermined rules may define when the GNSS navigation data are to be determined to be potentially manipulated or to be not potentially manipulated. To give a non-limiting example, such predetermined rules may be based on the assumption that, if the GNSS navigation data are not manipulated, the position estimate of the reference position determined at least partially based on the GNSS reference data representing one or more GNSS signals observed by the reference receiver and the GNSS navigation data received by the mobile device does not significantly deviate from the reference position of the reference receiver (e.g. the predetermined and/or known reference position of the reference receiver). Accordingly, the predetermined rules may define that, if the position estimate of the reference position significantly deviates from the reference position, the GNSS navigation data are determined to be potentially manipulated.

According to a further exemplary aspect of the invention, an apparatus is disclosed, wherein the apparatus comprises means for performing any one embodiment of the disclosed method (e.g. the steps of any one embodiment of the disclosed method) or a part thereof (e.g. at least some steps of any one embodiment of the disclosed method).

The means of the disclosed apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The disclosed apparatus may comprise a single means for all functions, a common plurality of means for all functions, or a plurality of different means for different functions.

According to a further exemplary aspect of the invention, an apparatus is disclosed, wherein the apparatus comprises at least one processor and at least one memory containing computer program code, the at least one memory and the computer program code with the at least one processor configured to cause the apparatus at least to perform any one embodiment of the disclosed method (e.g. the steps of any one embodiment of the disclosed method) or a part thereof (e.g. at least some steps of any one embodiment of the disclosed method).

For example, the disclosed apparatus(es) may be (a) module(s) or component(s) for (a) mobile device(s), for example (a) chip(s) or chipset(s) (e.g. a GNSS chip or a GNSS chipset). Alternatively, the disclosed apparatus(es) may be (a) mobile device(s). As disclosed above, the mobile device may be enabled for or support a GNSS based positioning solution like the Galileo system or the GPS system. This may be understood to mean that the mobile device is configured to estimate its position (e.g. determine a position estimate of its position) at least partially based on one or more GNSS signals (e.g. GNSS signals reveived from at least four GNSS satellites) observed at this position and GNSS navigation data (e.g. GNSS navigation data of the at least four GNSS satellites).

It is to be understood that the disclosed apparatus(es) may comprise only the disclosed components (e.g. means) or may further comprise one or more additional components (e.g. means). Examples of such additional components are a GNSS sensor, a communication interface (e.g. wireless communication interface like a receiver, a transmitter and/or a transceiver), a user interface (e.g. a touch-sensitive display, a keyboard, a touchpad, a display, etc.), etc.

According to a further exemplary aspect of the invention, a system is disclosed which comprises at least one of (1) the disclosed apparatus(es) (e.g. a mobile device), (2) a server and (3) a reference receiver. Optionally, the system may further comprise one or more GNSS satellites.

As disclosed above, the server may be configured to receive the GNSS reference data (i.e. the GNSS reference data representing one or more GNSS signals observed by the reference receiver) from the reference receiver and to provide (e.g. transmit) the GNSS reference data to the mobile device.

The server may be part of a plurality of servers (e.g. forming a server cloud) or may be represented by such a plurality of servers (e.g. forming a server cloud).

According to a further exemplary aspect of the invention, a non-transitory computer readable storage medium is disclosed, in which computer program code is stored. The computer program code may be the below disclosed computer program code. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

According to a further exemplary aspect of the invention, a computer program code is disclosed, the computer program code when executed by a processor (or by a plurality of processors) causing an apparatus to perform any one embodiment of the disclosed method (e.g. the steps of any one embodiment of the disclosed method). The computer program code may for example be or may be part of a computer program for the mobile device like an operating system for the mobile device, a GNSS driver programm for the mobile device or a GNSS application programm for the mobile device.

The disclosed method, apparatus(es), system, non-transitory computer readable storage medium and computer program code may be for identifying potentially manipulated GNSS navigation data (i.e. the GNSS navigation data received by the mobile device) at least partially based on GNSS reference data (i.e. the GNSS reference data representing one or more GNSS signals observed by the reference receiver).

In the following, further features and embodiments of these exemplary aspects of the invention will be described.

According to an exemplary embodiment of the invention, the method further comprises:

obtaining or holding available a representation of the position estimate of the reference position.

As disclosed above, a representation of the position estimate of the reference position of the reference receiver may be obtained by the mobile device as a result of the above disclosed determining of the position estimate of the reference position. Subsequently, the obtained representation of the position estimate may be hold available by the mobile device, for example by being stored in a memory of the mobile device.

According to an exemplary embodiment of the invention, the method further comprises:

obtaining or holding available a representation of the reference position of the reference receiver.

As disclosed above, the mobile device may hold available a representation of the reference position of the reference receiver, for example by being stored in a memory of the mobile device. Alternatively or additionally, the mobile device may obtain a representation of the reference position of the reference receiver, for example by receiving the representation of the reference position of the reference receiver together with the GNSS reference data.

According to an exemplary embodiment of the invention, the GNSS reference data (i.e. the GNSS reference data representing one or more GNSS signals observed by the reference receiver) further represent the reference position. This may be understood to mean that a representation of the reference position of the reference receiver is part of the GNSS reference data such that it is receivable together with the GNSS reference data.

According to an exemplary embodiment of the invention, the GNSS navigation data (i.e. the GNSS navigation data received by the mobile device) are determined to be potentially manipulated or to be not potentially manipulated at least partially based on a distance between the reference position and the position estimate of the reference position.

Accordingly, the method may further comprise:

determining the distance between the reference position and the position estimate of the reference position.

The distance between the reference position and the position estimate of the reference position may be understood to be an Euclidian distance (i.e. the length of the shortest possible path between both positions) or a Geodesic distance (e.g. the length of the shortest path between both positions along the curve of the Earth surface). It is however to be understood that the invention is not limited to this.

As disclosed above, the determining whether or not the GNSS navigation data (i.e. the GNSS navigation data received by the mobile device) are potentially manipulated may be based on the assumption that, if the GNSS navigation data are not manipulated, the position estimate of the reference position determined at least partially based on the GNSS reference data representing one or more GNSS signals observed by the reference receiver and the GNSS navigation data received by the mobile device does not significantly deviate from the reference position of the reference receiver (e.g. the predetermined and/or known reference position of the reference receiver). The distance between the reference position and the position estimate of the reference position may be considered to be indicative of whether or not the position estimate of the reference position significantly deviates from the reference position of the reference receiver. For example, if the distance between the reference position and the position estimate of the reference position is indicative of an expected deviation, the GNSS navigation data may be considered to be not potentially manipulated. Otherwise, if the distance between the reference position and the position estimate of the reference position is indicative of an unexpected deviation, the GNSS navigation data may be considered to be potentially manipulated. Therein, a distance greater than an expected accuracy of the position estimate of the reference position (e.g. an accuracy of the GNSS based positioning solution supported by the mobile device or for which the mobile device is enabled) may for example be considered to be indicative of an unexpected deviation and a distance shorter than or equal to an expected accuracy of the GNSS positioning solution may for example be considered to be indicative of an expected deviation.

For example, the GNSS navigation data are determined (1) to be potentially manipulated if the distance between the reference position and the position estimate of the reference position exceeds (i.e. is greater than) a predetermined distance threshold and (2) to be not potentially manipulated if the distance between the reference position and the position estimate of the reference position is below (e.g. shorter than) or equal to the predetermined distance threshold. Therein, the predetermined distance threshold may correspond to an expected accuracy of the position estimate of the reference position (e.g. an accuracy of the GNSS based positioning solution supported by the mobile device or for which the mobile device is enabled). For example, the accuracy of the Galileo open service is 1 m and the accuracy of GPS is 5 m. Accordingly, the predetermined distance threshold may be equal to 10 m (Galileo open service) or 50 m (GPS). It is however to be understood that the invention is not limited to this and that a different distance (e.g. 10 m, 25 m, 50 m, 75 m or 100 m) may be used as predetermined distance threshold, for example to compensate uncertainties associated with the disclosed method (e.g. due to errors of the GNSS reference data, errors introduced by the determining of the distance, etc.).

Alternatively or additionally, at least two different distance thresholds may be predetermined to be able to distinguish different probabilies that the GNSS navigation data are manipulated. Accordingly, the probability that the GNSS navigation data are manipulated may be determined based on such at least two different predetermined distance thresholds and the distance between the reference position and the position estimate of the reference position.

According to an exemplary embodiment of the invention, the method further comprises:

receiving other GNSS reference data representing one or more GNSS signals observed by another reference receiver at another reference position;

determining, at least partially based on the other GNSS reference data and the GNSS navigation data (i.e. the GNSS navigation data received by the mobile device), a position estimate of the other reference position;

determining, at least partially based on the other reference position and the other position estimate of the other reference position, whether or not the GNSS navigation data are potentially manipulated.

This may be understood to mean that the disclosed method or some steps of the disclosed method are at least partially repeated one or more times, wherein, in each repetition, other GNSS reference data representing one or more GNSS signals observed by another reference receiver and the same GNSS navigation data (i.e. the GNSS navigation data received by the mobile device) are considered. In particular, the determining steps may be repeated one or more times with other GNSS reference data, but the same GNSS navigation data. The other GNSS reference data may be received together with the initially received GNSS reference data or, in each repetition, other GNSS reference data may be received. Such repetitions may make the disclosed method more robust. For example, the percentage of repetitions in which the GNSS navigation data are determined to be potentially manipulated may be considered to be indicative of the the probability that the the GNSS navigation data are manipulated.

According to an exemplary embodiment of the invention, the method further comprises one or more of the following steps, if it is determined that the GNSS navigation data (i.e. the GNSS navigation data received by the mobile device) are potentially manipulated:

identifying or causing of identifying the GNSS navigation data as potentially manipulated;

rejecting the GNSS navigation data;

if a position of the mobile device is estimated at least partially based on the GNSS navigation data, identifying the position estimate as potentially manipulated;

associating the GNSS navigation data with a manipulation risk level.

Moreover, in case the disclosed method or some steps of the disclosed method are at least partially repeated one or more times, the method may alternatively or additionally comprise one or more of these steps, if the GNSS navigation data are determined to be potentially manipulated in a predetermined (e.g. predominant) percentage (e.g. more than 75% or 90%) of these repetitions.

Identifying the GNSS navigation data as potentially manipulated may be understood to mean that manipulation data identifying the GNSS navigation data as potentially manipulated are hold available by the mobile device, for example by being stored in a memory of the mobile device. Causing of identifying the GNSS navigation data as potentially manipulated may be understood to mean that the mobile device provides manipulation data to the reference receiver or another remote device like a server causing the reference receiver or the other remote device to identify the GNSS navigation data as potentially manipulated. This may have the effect that other mobile devices receiving the GNSS navigation data may be informed (e.g. by the reference receiver or the other remote device like the server) that the GNSS navigation data are potentially manipulated.

Rejecting the GNSS navigation data may be understood to mean that the rejected GNSS navigation data are not used for estimating (e.g. determining a position estimate of) a position of the mobile device. This has the effect that only GNSS navigation data which are considered to be trustworthy (i.e. not potentially manipulated) are used for estimating (e.g. determining a position estimate of) a position of the mobile device.

Identifying a position estimate as potentially manipulated may be understood to mean that manipulation data identifying the position estimate as potentially manipulated are hold available by the mobile device, for example by being stored in a memory of the mobile device. For example, the manipulation data may be stored together or may be part of position data containing a representation of the position estimate (e.g. in the form of positioning coordinates). By identifying the position estimate as potentially manipulated, the potential manipulation can be considered when further processing the position estimate. For example, business services or applications which rely on trustworthy positioning like car sharing services may not use position estimates identified as potentially manipulated. Other business services or applications may however consider position estimates identified as potentially manipulated.

Associating the GNSS navigation data with a manipulation risk level may be understood to mean that manipulation risk level data representing a manipulation risk level are hold available by the mobile device, for example by being stored in a memory of the mobile device. A manipulation risk level may be understood to be indicative of a probability that the GNSS navigation data are manipulated. For example, a manipulation risk level may represent a percentage indicative of the a probability that the GNSS navigation data are manipulated. As disclosed above, the probability that the GNSS navigation data are manipulated may for example be determined based on at least two different predetermined distance thresholds and the distance between the reference position and the position estimate of the reference position. Alternatively or additionally, the probability that the GNSS navigation data are manipulated may for example be determined to be equal to the percentage of repetitions in which the GNSS navigation data are identified as potentially manipulated.

According to an exemplary embodiment of the invention, the GNSS navigation data (i.e. the GNSS navigation data received by the mobile device) contain at least one of (1) ephemeris data of a GNSS satellite and (2) clock data of the GNSS satellite.

In certain exemplary embodiments of the invention, the ephemeris data may enable determining an orbital position of the GNSS satellite at a given time. For example, the ephemeris data may represent or contain keplerian parameters. In particular, the ephemeris data may represent or contain ephemeris parameters as specified by the Galileo open service specifications or GPS specifications.

In certain exemplary embodiments of the invention, the clock data enable determining a deviation of a clock of the GNSS satellite from a GNSS system time (e.g. Galileo system time or GPS time) at a given time. For example, the clock data may represent or contain clock correction parameters. In particular, the clock data may represent or contain clock correction parameters as specified by Galileo open service specifications or GPS specifications.

According to an exemplary embodiment of the invention, the GNSS navigation data (i.e. the GNSS navigation data received by the mobile device) or parts thereof are (e.g. only) valid for a limited time period.

For example, the GNSS navigation data may contain or represent a reference time for the GNSS navigation data or parts thereof. For example, the GNSS navigation data or parts thereof may be valid for a predetermined time period before and after such a reference time. Alternatively or additionally, the GNSS navigation data may contain or represent a validity time indicating until when the GNSS navigation data or parts thereof are valid. A reference time or a validity time may be represented by or contained in the GNSS navigation data in the GNSS system time (e.g. GPS time or Galileo system time). In particular, a reference time or a validity time may be represented by or contained in the GNSS navigation data in seconds in the respective GNSS week (e.g. GPS week or Galileo week).

As disclosed above, the GNSS navigation data may contain ephemeris data enabling determining an orbital position of the GNSS satellite at a given time and/or clock data enabling determining a deviation of a clock of the GNSS satellite from a GNSS system time (e.g. Galileo system time or GPS time) at a given time. The ephemeris data or clock data may be only valid for a limited period of time and may no be used after this limited period of time. Accordingly, the ephemeris data and/or clock data may be parts of the GNSS navigation data that are only valid for a limited time period.

According to an exemplary embodiment of the invention, each GNSS satellite of a GNSS system periodically broadcasts respective GNSS navigation data. As disclosed above, the respective GNSS navigation data (i.e. the GNSS navigation data received by the mobile device) may be part of a message conveyed by a respective GNSS signal broadcasted by the respective GNSS satellite. An example of such a message is a Galileo F/NAV message as specified by the Galileo open service specifications or a GPS navigation message as specified by the GPS specifications.

According to an exemplary embodiment of the invention, the GNSS reference data (i.e. the GNSS reference data representing one or more GNSS signals observed by the reference receiver) are received via a wireless communication path. As disclosed above, an example of such a wireless communication path is a wireless communication connection or link in a wireless communication network, in particular a terrestrial wireless communication network like a WLA) or a cellular network.

According to an exemplary embodiment of the invention, the method further comprises:
- observing one or more GNSS signals at a position of the mobile device;
- estimating the position of the mobile device at least partially based on the GNSS signals and the GNSS navigation data (i.e. the GNSS navigation data received by the mobile device).

Observing one or more GNSS signals at the position of the mobile device may for example be understood to mean that the one or more GNSS signals are received by the mobile device when scanning for observable GNSS signals at this position.

Estimating the position of the mobile device at least partially based on the GNSS signals and the GNSS navigation data may be understood to mean that the estimation depends on the GNSS signals and the GNSS navigation data. It is however to be understood that the estimating may optionally depend on further data or information.

Moreover, estimating the position of the mobile device may be understood to mean that a position estimate of the position of the mobile device is determined at least partially based on the GNSS signals and the GNSS navigation data. Therein, the estimating or determining may be performed according to a predetermined GNSS positioning algorithm as disclosed above in more detail with respect to determining a position estimate of the reference position of the reference receiver.

As disclosed above, it may be necessary that the mobile device observes at least four GNSS satellites to enable that mobile device to estimate its position based on the observed GNSS signals and (e.g. valid) GNSS navigation data of these at least four GNSS satellits It is to be understood that the presentation of the invention in this section is merely by way of examples and non-limiting.

Other features of the invention will become apparent from the following detailed description considered in conjunction with the accompanying figures. It is to be understood, however, that the figures are designed solely for purposes of illustration and not as a definition of the limits of the invention, for which reference should be made to the appended claims. It should be further understood that the figures are not drawn to scale and that they are merely intended to conceptually illustrate the structures and procedures described herein.

DETAILED DESCRIPTION OF THE FIGURES

The following description serves to deepen the understanding of the present invention and shall be understood to complement and be read together with the description of example embodiments of the invention as provided in the above SUMMARY section of this specification.

Figure 1:
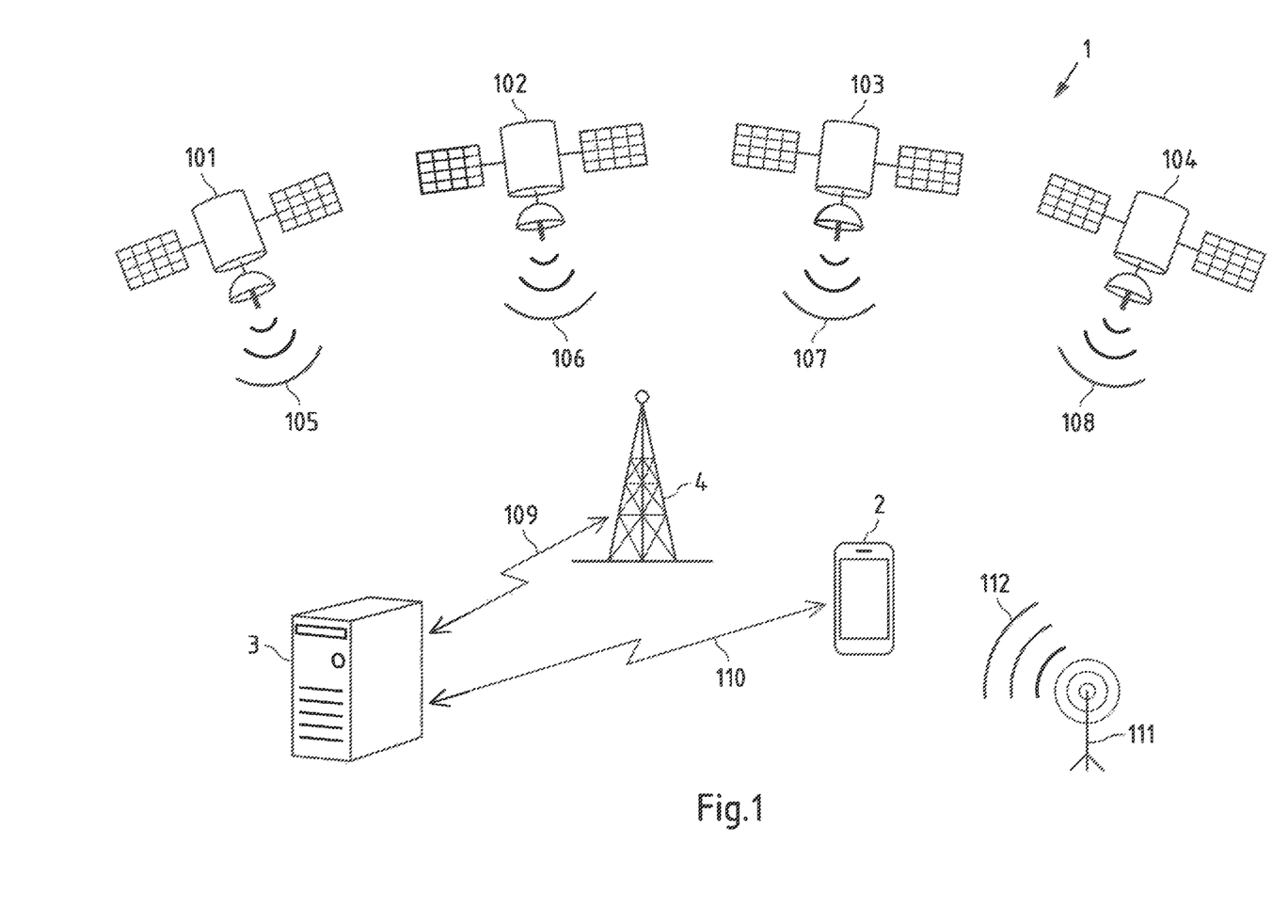
FIG. 1 is a block diagram of an exemplary embodiment of a system according to the invention.

FIG. 1 is a schematic high-level block diagram of a system 1 according to an exemplary aspect of the invention. Without limiting the scope of the invention, it is assumed in the following that system 1 is part of a GNSS based positioning solution.

For illustrative purposes, FIG. 1 shows four GNSS satellites 101 to 104 of a GNSS system like the Galileo system or the GPS system. Each GNSS satellite of GNSS satellites 101 to 104 (e.g. periodically or repeatedly or continuously) broadcasts a respective GNSS signal of GNSS signals 105 to 108 conveying a respective message containing respective GNSS navigation data. In the following, it is assumed that the respective GNSS navigation data contain ephemeris data that enable determining an orbital position of the respective GNSS satellite at a given time for a limited period of time and clock data that enable determining a deviation of a clock of the respective GNSS satellite from a GNSS system time at a given time for a limited period of time. As disclosed above, an example of such a message is a Galileo F/NAV message as specified by the Galileo open service specifications or a GPS navigation message as specified by the GPS specifications. Accordingly, ephemeris data may represent or contain ephemeris parameters as specified by the Galileo open service specifications or the GPS specifications; and the clock data may represent or contain clock correction parameters as specified by Galileo open service specifications or the GPS specifications.

System 1 comprises a mobile device 2, a server 3 and a reference reveiver 4. Reference receiver 4 and server 3 may communicate with each other via communication path 109; server 3 and mobile device 2 may communication with each other via communication path 110. Communication paths 109 and 110 may be direct or indirect communication paths. For example, communication paths 109 and 110 may comprise one or more hops, for example one or more communication links or communication connections. In the following, it is assumed that communication paths 109 and 110 are wireless communication connections in a cellular network like a 2G/3G/4G/5G cellular communication network. It is however to be understood that the invention is not limited to this.

Without liming the scope of the invention, FIG. 1 only shows a single reference receiver 4. System 1 may however comprise more than one reference receiver 4. Accordingly, reference receiver 4 may be part of a plurality of reference receivers. The disclosure regading reference receiver 4 may thus be understood to be applicable to each reference receiver of such a plurality.

Reference receiver 4 is a stationary device that is fixedly located at a known reference position. As disclosed below in more detail, reference receiver 4 may report (e.g. transmit) GNSS reference data representing one or more GNSS signals (e.g. GNSS signals 105 to 108) observed by reference receiver 4 when scanning for observable GNSS signals at the reference position.

Moreover, system 1 is not limited to a single server 3, but may optionally comprise a plurality of servers (e.g. forming a server cloud). Accordingly, server 3 may be part of such a plurality of servers (e.g. a server cloud) or may be represented by such a plurality of servers (e.g. a server cloud). As disclosed below in more detail, server 3 may collect (e.g. receive and store) GNSS reference data reported by reference receivers like reference receiver 4 and provide collected GNSS reference data to mobile devices like mobile device 2.

For example, mobile device 2 may be one of a smart home device, a smartphone, a tablet computer, a notebook computer, a smart watch, and a smart band. Mobile device 2 may support the GNSS based positioning solution. This may be understood to mean that mobile device 2 is configured to estimate its position (e.g. determine a position estimate of its position) at least partially based on GNSS signals 105 to 108 observed at this position and valid GNSS navigation data of GNSS satellites 101 to 104.

Since the GNSS navigation data are crucial for the GNSS based positioning solution and only valid for a limited period of time, the GNSS navigation data need to be updated at regular intervals. This may be exploited by an attacker by installing a spoofing device 111 in a certain area which broadcasts a spoofed GNSS signal 112. For example, spoofed GNSS signal 112 may be falsified such that it resembles GNSS signal 105 broadcast by GNSS satellite 101, but spoofed GNSS signal 112 may convey a message containing manipulated GNSS navigation data, for example to cause mobile device 2 to estimate its position to be somewhere other than it actually is. As disclosed in more detail below with respect to FIG. 5, this threat may be mitigated by the disclosed method.

Figure 2:
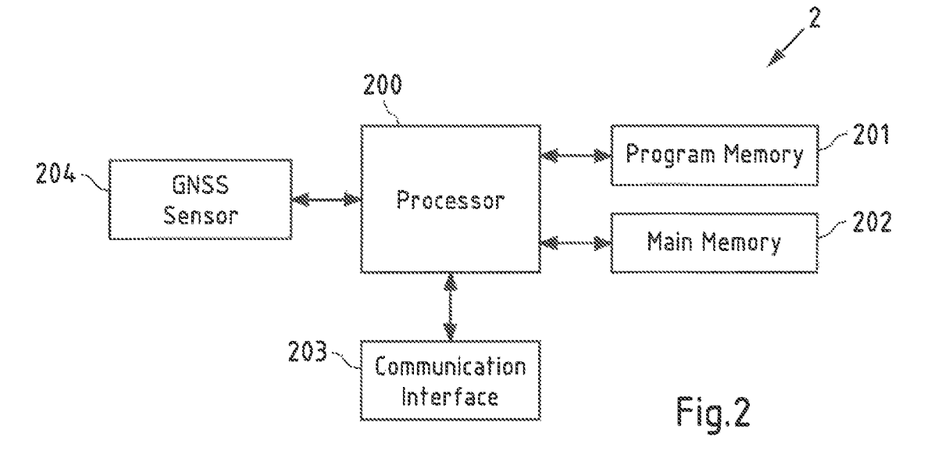
FIG. 2 is a block diagram of an exemplary embodiment of a mobile device according to the invention.

FIG. 2 is a block diagram of an exemplary embodiment of mobile device 2 according to the invention. In the following, it is assumed that mobile devices 2 of FIG. 1 corresponds to this mobile device 2.

Mobile device 2 comprises a processor 200. Processor 200 may represent a single processor or two or more processors, which are for instance at least partially coupled, for instance via a bus. Processor 200 executes a computer program code stored in program memory 201 (e.g. computer program code causing mobile device 2 to perform any one embodiment of the disclosed method (e.g. the steps of any one embodiment of the disclosed method) or a part thereof (e.g. at least some steps of any one embodiment of the disclosed method) (as for instance further described below with reference to FIG. 5), when executed on processor 200), and interfaces with a main memory 202. Program memory 201 may also contain an operating system for processor 200 and further data like GNSS navigation data, GNSS reference data and representations of the known reference positions of reference receivers like reference receiver 4. Some or all of memories 201 and 202 may also be included into processor 200. One of or both of memories 201 and 202 may be fixedly connected to processor 200 or at least partially removable from processor 200, for example in the form of a memory card or stick.

A program memory (e.g. program memory 201) may for example be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 202) may for example be a volatile memory. It may for example be a DRAM memory, to give non-limiting example. It may for instance be used as a working memory for a processor (e.g. processor 200) when executing an operating system and/or programs.

Processor 200 further controls a wireless communication interface 203 configured for communicating via a cellular network (e.g. to transmit and receive cellular radio signals). For example, wireless communication interface 203 may be or may comprise a 2G/3G/4G/5G radio transceiver. Mobile device 2 may use wireless communication interface 203 to receive GNSS reference data from server 3 of system 1 (e.g. via wireless communication path 110).

Moreover, processor 200 controls a GNSS sensor 204 configured for receiving GNSS signals (e.g. GNSS signals 105 to 108 broadcasted by GNSS satellites 101 to 104 of FIG. 1). GNSS sensor 204 is configured for (e.g. periodically or repeatedly) scanning for observable GNSS signals (e.g. GNSS signals 105 to 108 broadcasted by GNSS satellites 101 to 104 of FIG. 1). Therein, a respective GNSS signal may be understood to be observable if the respective GNSS signal is receivable with a minimum quality (e.g. a minimum quality enabling a carrier locking and code locking of the respective observed GNSS signal) by GNSS sensor 204.

GNSS sensor 204 enables mobile device 2 to receive GNSS navigation data contained in a message conveyed in an observed GNSS signal. To this end, GNSS sensor 204 may be configured for extracting the GNSS navigation data from the received or observed GNSS signal. Moreover, GNSS sensor 204 enables mobile device 2 to estimate its position based on GNSS signals observed when scanning for GNSS signals at this position. For example, GNSS sensor 204 may be configured for providing processor 200 with data necessary for determining a position estimate of the position of mobile device 2. To this end, GNSS sensor 204 may be configured for determining, for each of the observed GNSS signals, respective GNSS observation data relating to the observation of the respective GNSS signal by GNSS sensor 204 which enable determining a pseudorange between the mobile device and the respective GNSS satellite broadcasting the respective observed GNSS signal. It is to be understood that any computer program code required for receiving and processing received GNSS signals may be stored in an own memory of GNSS sensor 204 and executed by an own processor of GNSS sensor 204 or it may be stored for example in program memory 201 and executed for example by processor 200.

The components 201 to 204 of mobile device 2 may for instance be connected with processor 200 by means of one or more serial and/or parallel busses.

It is to be understood that mobile device 2 may comprise various other components like a user interface for receiving user input.

Figure 3:
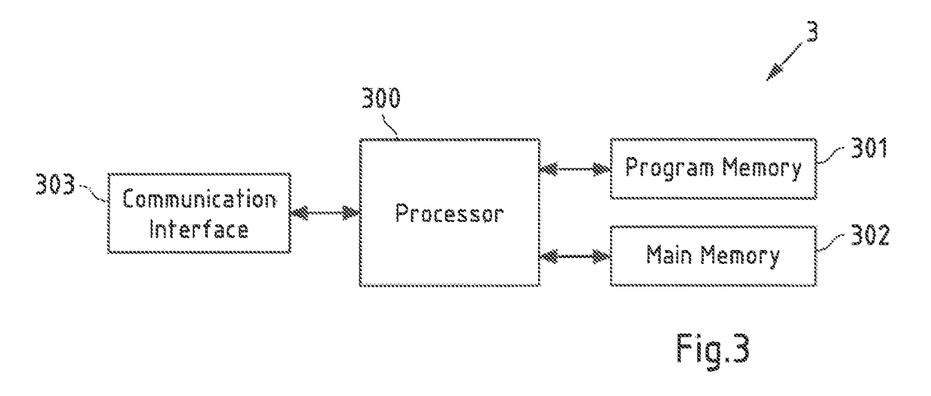
FIG. 3 is a block diagram of an exemplary embodiment of a server according to the invention.

FIG. 3 is a block diagram of an exemplary embodiment of server 3 according to the invention. In the following, it is assumed that server 3 of system 1 of FIG. 1 corresponds to this server 3.

Server 3 comprises a processor 300. Processor 300 may represent a single processor or two or more processors, which are for instance at least partially coupled, for instance via a bus. Processor 300 executes a computer program code (e.g. computer program code causing server 3 to store GNSS reference data received from reference receiver 4 or from a plurality of reference receivers comprising reference receiver 4 and to provide stored GNSS reference data to mobile device 2 of system 1) stored in program memory 301, and interfaces with a main memory 302. Accordingly, program memory 301 may contain GNSS reference data. Program memory 301 may also contain an operating system for processor 300. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a communication interface 303 which is configured to communicate via a communication network. Server 3 may use communication interface 303 to communicate with mobile device 2 and reference receiver 4 of system 1. In the following, it is assumed that communication interface 303 is a wireless communication interface configured for communicating via a cellular network (e.g. to transmit and receive cellular radio signals). For example, communication interface 303 may be or may comprise a 2G/3G/4G/5G radio transceiver. For example, server 3 may use communication interface 303 to receive GNSS reference data from reference receiver 4 of system 1(e.g. via wireless communication path 109) or from a plurality of reference receivers comprising reference receiver 4. Moreover, server 3 may use communication interface 303 to transmit stored GNSS reference data to mobile device 2 of system 1 (e.g. via wireless communication path 110).

The components 301 to 303 of server 3 may for example be connected with processor 300 by means of one or more serial and/or parallel busses.

It is to be understood that server 3 may comprise various other components like a user interface for receiving user input.

Figure 4:
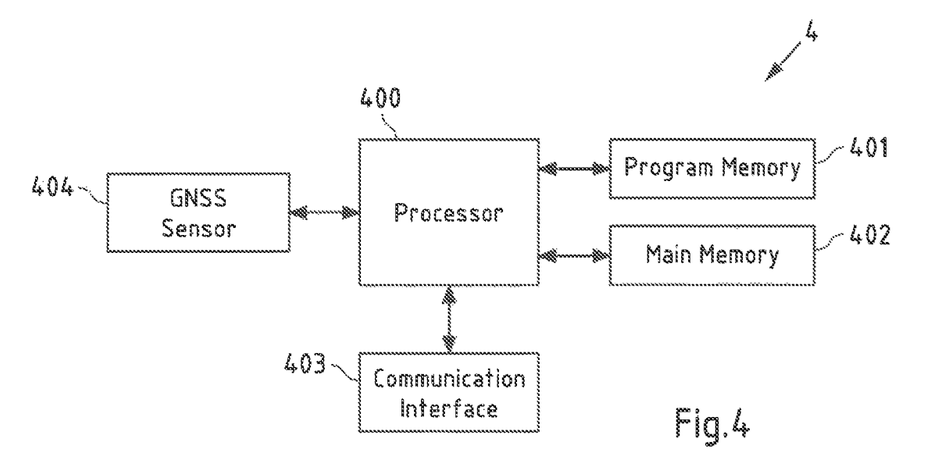
FIG. 4 is a block diagram of an exemplary embodiment of a reference receiver according to the invention.

FIG. 4 is a block diagram of an exemplary embodiment of reference receiver according to the invention. In the following, it is assumed that reference receiver 4 of system 1 of FIG. 1 corresponds to this reference receiver 4.

Reference receiver 4 comprises a processor 400. Processor 400 may represent a single processor or two or more processors, which are for instance at least partially coupled, for instance via a bus. Processor 400 executes a computer program code (e.g. computer program code causing reference receiver 4 to determine and/or report GNSS reference data to server 3 of system 1) stored in program memory 401, and interfaces with a main memory 402. Program memory 401 may also contain an operating system for processor 400. Some or all of memories 401 and 402 may also be included into processor 400. One of or both of memories 401 and 402 may be fixedly connected to processor 400 or at least partially removable from processor 400, for example in the form of a memory card or stick.

Processor 400 further controls a communication interface 403 which is configured to communicate via a communication network. Reference receiver 4 may use communication interface 403 to communicate with server 3 of system 1. In the following, it is assumed that communication interface 403 is a wireless communication interface configured for communicating via a cellular network (e.g. to transmit and receive cellular radio signals). For example, communication interface 403 may be or may comprise a 2G/3G/4G/5G radio transceiver. For example, reference receiver 4 may use communication interface 403 to transmit GNSS reference data to server 3 of system 1 (e.g. via wireless communication path 109).

Moreover, processor 400 controls a GNSS sensor 404 configured for receiving GNSS signals (e.g. GNSS signals 105 to 108 broadcasted by GNSS satellites 101 to 104 of FIG. 1). GNSS sensor 404 is configured for (e.g. periodically or repeatedly) scanning for observable GNSS signals (e.g. GNSS signals 105 to 108 broadcasted by GNSS satellites 101 to 104 of FIG. 1). GNSS sensor 404 enables reference receiver 4 to determine GNSS reference data representing one or more GNSS signals observed when scanning for observable GNSS signals. For example, the GNSS reference data contain GNSS observation data relating to the observation of the observed GNSS signals. To this end, GNSS sensor 404 may be configured for determining, for each of the GNSS signals observed when scanning for observable GNSS signals, respective GNSS observation data relating to the observation of the respective GNSS signal by GNSS sensor 404 (e.g. representing at least one of (1) a respective time-of-arrival and (2) a respective time-of-flight of the respective GNSS signal). Optionally, the GNSS reference data may for example further contain GNSS data contained in one or more messages or parts of messages conveyed by the observed GNSS signals. To this end, GNSS sensor 404 may for example be further configured for extracting, from each of the GNSS signals observed when scanning for observable GNSS signal, respective GNSS data contained in a message or a part thereof conveyed by the respective GNSS signal (e.g. representing a respective time-of-transmission of the respective GNSS signal from the respective GNSS satellite).

The components 401 to 404 of reference receiver 4 may for example be connected with processor 400 by means of one or more serial and/or parallel busses.

It is to be understood that reference receiver 4 may comprise various other components like a user interface for receiving user input.

Figure 5:
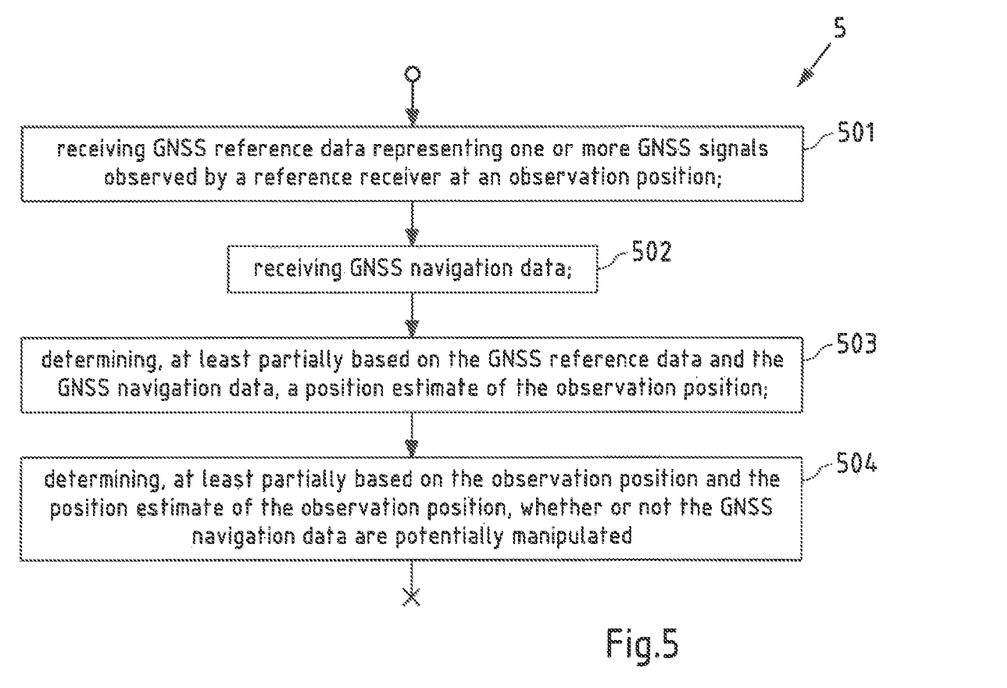
FIG. 5 is a flow chart illustrating an exemplary embodiment of a method according to the invention.

FIG. 5 is a flow chart 5 illustrating an exemplary embodiment of a method according to the invention. Without limiting the scope of the invention, it is assumed in the following that mobile device 2 as disclosed above with respect to system 1 of FIG. 1 performs the steps of flow chart 5.

In a step 501, GNSS reference data representing one or more GNSS signals observed by reference receiver 4 at areference position are received by mobile device 2. For example, the GNSS reference data may be received from server 3 via wireless communication path 110 in step 501.

Received GNSS reference data may be stored in program memory 201.

As disclosed above, the GNSS reference data may contain, for each GNSS signal observed by reference receiver 4 when scanning for observable GNSS signals, respective GNSS observation data relating to the observation of the respective GNSS signal by GNSS sensor 204 (e.g. representing at least one of (1) a respective time-of-arrival and (2) a respective time-of-flight of the respective GNSS signal) and, optionally, respective GNSS data contained in a message or a part thereof conveyed by the respective GNSS signal (e.g. representing a respective time-of-transmission of the respective GNSS signal from the respective GNSS satellite).

In the following, it is assumed that the GNSS reference data received in step 501 represent GNSS signals 105 to 108 observed by reference receiver 4 and contain, for each GNSS signal of GNSS signals 105 to 108, respective GNSS observation data representing a respective time-of-arrival and a respective time-of-flight of the respective GNSS signal.

It is to be understood that other GNSS reference data representing one or more GNSS signals observed by other reference receivers (e.g. other reference receives of the above disclosed plurality of reference receivers) at other reference positions may be received in step 501 as well.

In a step 502, GNSS navigation data are received by mobile device 2.

As disclosed above, each GNSS satellite of GNSS satellites 101 to 104 broadcasts a respective GNSS signal of GNSS signals 105 to 108 conveying a respective message containing respective GNSS navigation data containing ephemeris and clock data. Spoofing device 111 brodcasts a spoofed GNSS signal 112 which is falsified such that it resembles GNSS signal 105 broadcast by GNSS satellite 101, but spoofed GNSS signal 112 may convey a message containing manipulated GNSS navigation data.

Mobile device 2 may for example receive the GNSS navigation data from one of GNSS satellites 101 to 104 or from spoofing device 111 in step 502 by receiving a GNSS signal or spoofed GNSS signal conveying a message containing GNSS navigation data or manipulated GNSS navigation data and by (2) extracting the GNSS navigation data or the manipulated GNSS navigation data from the received GNSS signal.

Received GNSS navigation data may be stored in program memory 201.

In the following, it is assumed that the GNSS navigation data of GNSS satellite 101 are received from GNSS satellite 101 in step 502. It is however to be understood that the invention is not limited to this. For example, further GNSS rnvigation data may be received from further GNSS satellites like GNSS satellite 102 to 103 in step 502. Alternatively or additionally, manipulated GNSS navigation data may be received from spoofing device 111 in step 502.

In a step 503, a position estimate of the reference position of reference receiver 4 is determined by mobile device 2 at least partially based on the GNSS reference data reveived in step 501 and the GNSS navigation data received in step 502. The position estimate determined in step 503 may be understood to be a representation of the reference position obtained as a result of the determining. It is however to be understood that the position estimate determined in step 503 may deviate from the known reference position of reference receiver 4 (e.g. due to uncertainties like measurement errors or due to manipulation of the GNSS navigation data).

The position estimate determined in step 503 may be stored in program memory 201.

The determining in step 503 may be performed according to a predetermined GNSS positioning algorithm. Without liming the scope of the invention, exemplary steps of such a GNSS positioning algorithm applied to the GNSS reference data representing GNSS signals 105 to 108 (e.g. as received in step 501) are disclosed in the following:

(1) Determining, for each of GNSS signals 105 to 108 represented by the GNSS reference data, a respective pseudorange between reference receiver 4 and the respective GNSS satellite of GNSS satellites 101 to 104. For example, the respective pseudorange may be understood to be a pseudo distance between the between reference receiver 4 and the respective GNSS satellite. Such a pseudorange may be determined based on the time-of-flight of the respective GNSS signal which may be represented by the GNSS reference data. The pseudorange may then for example be obtained by multiplying the determined time-of-flight with the speed-of-light.

As disclosed above, it is presently assumed that GNSS navigation data of GNSS satellite 101 are received in step 502. Accordingly, the pseudorange between reference receiver 4 and GNSS satellite 101 may be determined in step 503 at least partially based on the GNSS reference data received in step 501 and the clock data contained in the GNSS navigation data received in step 502. For example, a time-of-flight of GNSS signal 105 is represented by the GNSS reference data received in step 501 and the clock data is contained in the GNSS navigation data received in step 502. Due to uncertainties (e.g. uncertainties in the receiver clock, measurement errors, etc.), the time-of-flight may deviate from the real time-of-flight and, thus, the pseudorange obtained by multiplying the time-of-flight with the speed of flight may be not exact as well (which is the reason why the term pseudorange is used instead of the term range).

In a similar way, the pseudoranges between reference receiver 4 and GNSS satellites 102 to 103 may be determined at least partially based on the GNSS reference data received in step 501 and the respective clock data contained in the respective GNSS navigation data of the respective GNSS satellite. Therein, the respective GNSS navigation data of the respective GNSS satellite of GNSS satellites 102 to 104 may have been received in step 502 as well or may have been received before by mobile device.

(2) Determining, for each of GNSS satellites 101 to 104, a respective orbital position at the respective time-of-transmission at least partially based on the respective GNSS navigation data of the respective GNSS satellite. Such an orbital position at the time-of-transmission may be determined based on the respective ephemeris data contained in the respective GNSS navigation data.

As disclosed above, it is presently assumed that GNSS navigation data of GNSS satellite 101 are received in step 502. Accordingly, the orbital position of GNSS satellite 101 at the time-of-transmission of GNSS signal 105 may be determined in step 503 at least partially based on the ephemeris data contained in the GNSS navigation data received in step 502. In a similar way, the orbital positions of GNSS satellites 102 to 103 may be determined at least partially based on the ephemeris data contained in the respective GNSS navigation data of the respective GNSS satellite. Therein, the respective GNSS navigation data of the respective GNSS satellite of GNSS satellites 102 to 104 may have been received in step 502 as well or may have been received before by mobile device.

(3) Determining the position estimate of the reference position of reference receiver 4 at least partially based on the determined pseudoranges and the determined orbital positions, for examply by solving a GNSS observation equation system at least partially based on the determined pseudoranges and the determined orbital positions.

It is to be understood that the these steps (1) to (3) are only exemplary and that the position estimate of the reference position of reference receiver 4 may be determined in a different manner in step 503 equally well.

In a step 504, it is determined by mobile device 2, at least partially based on the reference position and the position estimate of the reference position, whether or not the GNSS navigation data received in step 502 are potentially manipulated.

As disclosed above, the determining in step 504 may be based on the assumption that, if the GNSS navigation data received in step 502 are not manipulated, the position estimate of the reference position determined in step 503 at least partially based on the GNSS reference data received in step 501 and the GNSS navigation data received in step 502 does not significantly deviate from the known reference position of reference receiver 4.

Since the distance between the known reference position of reference receiver 4 and the position estimate of the reference position determined in step 503 may be considered to be a indicative of such a significant deviation, the determining in step 504 may be at least partially based on a distance between the known reference position of receiver 4 and the position estimate of the reference position determined in step 503. Accordingly, the determining in step 504 may comprise determining the distance between the known reference position of reference receiver 4 which is for example stored in program memory 4 as disclosed above and the position estimate of the reference position determined in step 503. Therein, the distance between the known reference position of reference receiver 4 and the position estimate of the reference position determined in step 503 may be understood to be an Euclidian distance (i.e. the length of the shortest possible path between both positions) or a Geodesic distance (e.g. the length of the shortest path between both positions along the curve of the Earth surface).

In step 504, the GNSS navigation data received in step 502 are for example determined (1) to be potentially manipulated if the distance between the known reference position of reference receiver 4 and the position estimate of the reference position determined in step 503 exceeds (i.e. is greater than) a predetermined distance threshold and (2) to be not potentially manipulated if the distance between the known reference position of reference receiver 4 and the position estimate of the reference position determined in step 503 is below (e.g. shorter than) or equal to the predetermined distance threshold. Therein, the predetermined distance threshold may correspond to an expected accuracy of the GNSS based positioning solution supported by mobile device 2.

As disclosed above in more detail, if it is determined in step 504 that the GNSS navigation data received in step 502 are potentially manipulated, the GNSS navigation data may for example be identified as potentially manipulated or may be rejected.

It is to be understood that flowchart 5 or some steps of flowchart 5 (e.g. steps 501, 503 and 504) may be at least partially be repeated one or more times. In such a repetition, other GNSS reference data representing one or more GNSS signals observed by another reference receiver, but the same GNSS navigation data may be considered. This may have the effect that another position estimate of the reference position (i.e. another reference position) of the other reference receiver is determined in step 503 and the determining in step 504 is at least partially based on the known reference position of the other reference receiver and the other positione estimate. Such repetitions may make the disclosed method more robust. For example, the GNSS navigation data may only be identified as potentially manipulated or may be rejected, if they are determined to be potentially manipulated in a predetermined (e.g. predominant) percentage (e.g. more than 75% or 90%) of these repetitions. Alternatively or additionally, the percentage of repetitions in which the GNSS navigation data are identified as potentially manipulated may be associated with the GNSS navigation data as manipulation risk level.

Figure 6:
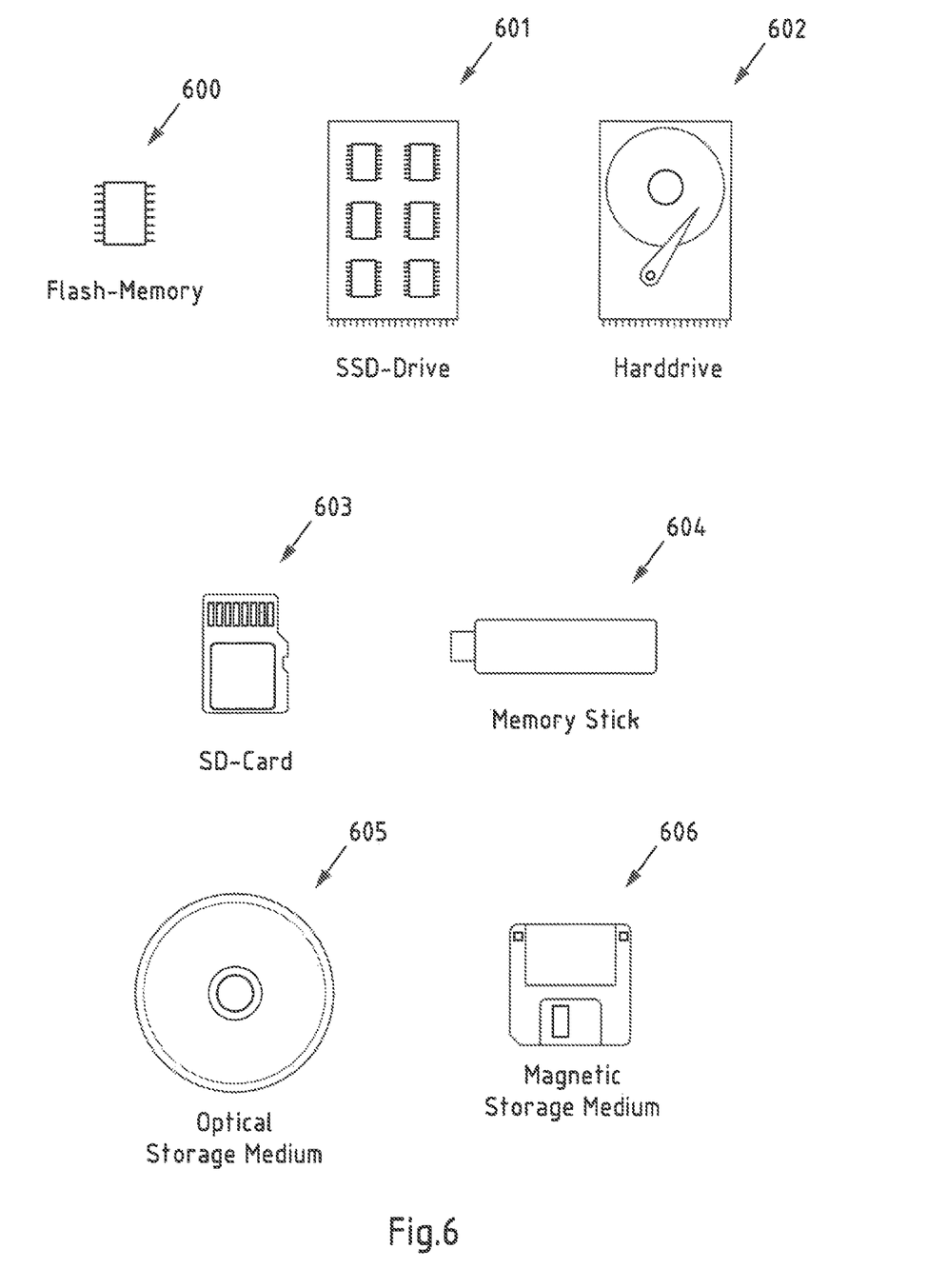
FIG. 6 is a schematic illustration of examples of tangible and non-transitory storage media according to the invention.

FIG. 6 is a schematic illustration of examples of tangible and non-transitory computer-readable storage media according to the present invention that may for instance be used to implement memory 201 of FIG. 2, memory 301 of FIG. 3 and memory 401 of FIG. 4. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:

(a) hardware-only circuit implementations (such as implementations in only analog and/or digital circuitry)

(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile device, to perform various functions) and (c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The wording "A, or B, or C, or a combination thereof" or "at least one of A, B and C" may be understood to be not exhaustive and to include at least the following: (1) A, or (2) B, or (3) C, or (4) A and B, or (5) A and C, or (6) B and C, or (7) A and B and C.

It will be understood that all presented embodiments are only exemplary, and that any feature presented for a particular exemplary embodiment may be used with any aspect of the invention on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

That which is claimed is:

1. A method performed by a mobile device, said method comprising:
   receiving GNSS reference data representing one or more GNSS signals observed by a reference receiver at a reference position;
   receiving GNSS navigation data broadcast by at least one of one or more respective GNSS satellites or one or more spoofing devices;
   determining, at least partially based on said GNSS reference data and said GNSS navigation data, a position estimate of said reference position;
   determining, at least partially based on said reference position and said position estimate of said reference position, whether or not said GNSS navigation data are potentially manipulated based at least in part on a distance between said reference position and said position estimate; and
   responsive to determining that said GNSS navigation data are potentially manipulated, causing one or more applications operating at least in part on the mobile device to at least one of (a) reject said GNSS navigation data, (b) identify a position estimate determined based at least in part on said GNSS navigation data as being potentially manipulated, or (c) determine a manipulation risk level indicating a probability that said GNSS navigation data are manipulated and associate the manipulation risk level with said GNSS navigation data.

2. The method according to claim 1, said method further comprising:
   obtaining or holding available a representation of said reference position of said reference receiver.

3. The method according to claim 1, wherein said GNSS reference data further represent said reference position.

4. The method according to claim 1, wherein said GNSS navigation data are determined to be potentially manipulated if said distance between said reference position and said position estimate of said reference position exceeds a distance threshold.

5. The method according to claim 1, wherein said GNSS navigation data contain at least one of ephemeris data of a GNSS satellite and clock data of said GNSS satellite.

6. The method according to claim 5, wherein said ephemeris data enable determining an orbital position of said GNSS satellite at a given time, and wherein said satellite clock data enable determining a deviation of a clock of said GNSS satellite from a GNSS system time at a given time.

7. The method according to claim 1, wherein said GNSS navigation data are only valid for an indicated time period.

8. The method according to claim 1, wherein each GNSS satellite of a GNSS system periodically broadcasts respective GNSS navigation data.

9. The method according to claim 1, wherein said GNSS reference data are received via a wireless communication path.

10. The method according to claim 1, said method further comprising:
    observing one or more GNSS signals at a position of said mobile device; and
    estimating said position of said mobile device at least partially based on said GNSS signals and said GNSS navigation data.

11. The method according to claim 1, wherein said one or more applications are configured to determine whether to use a position estimate of the mobile device determined based at least in part on the GNSS navigation data based at least in part on said result of determining whether or not said GNSS navigation data are potentially manipulated.

12. The method according to claim 1, further comprising:
    receiving one or more GNSS signals; and
    determining a position estimate of the mobile device based at least in part on the one or more GNSS signals and the GNSS navigation data, wherein one or more applications operating at least in part on the mobile device are configured to determine whether to use the position estimate of the mobile device based at least in part on said result of determining whether or not said GNSS navigation data are potentially manipulated.

13. A non-transitory computer readable storage medium storing computer program code, wherein the computer program code, when executed by one or more processors, causing an apparatus to perform:
    receiving GNSS reference data representing one or more GNSS signals observed by a reference receiver at a reference position;
    receiving GNSS navigation data broadcast by at least one of one or more respective GNSS satellites or one or more spoofing devices;
    determining, at least partially based on said GNSS reference data and said GNSS navigation data, a position estimate of said reference position;
    determining, at least partially based on said reference position and said position estimate of said reference position, whether or not said GNSS navigation data are potentially manipulated based at least in part on a distance between said reference position and said position estimate; and
    responsive to determining that said GNSS navigation data are potentially manipulated, causing one or more applications operating at least in part on the mobile device to at least one of (a) reject said GNSS navigation data, (b) identify a position estimate determined based at least in part on said GNSS navigation data as being potentially manipulated, or (c) determine a manipulation risk level indicating a probability that said GNSS navigation data are manipulated and associate the manipulation risk level with said GNSS navigation data.

14. An apparatus comprising at least one processor and at least one memory containing computer program code, the at least one memory and the computer program code with the at least one processor configured to cause the apparatus at least to perform:
    receiving GNSS reference data representing one or more GNSS signals observed by a reference receiver at a reference position;
    receiving GNSS navigation data broadcast by at least one of one or more respective GNSS satellites or one or more spoofing devices;
    determining, at least partially based on said GNSS reference data and said GNSS navigation data, a position estimate of said reference position;
    determining, at least partially based on said reference position and said position estimate of said reference position, whether or not said GNSS navigation data are potentially manipulated based at least in part on a distance between said reference position and said position estimate; and responsive to determining that said GNSS navigation data are potentially manipulated, causing one or more applications operating at least in part on the mobile device to at least one of (a) reject said GNSS navigation data, (b) identify a position estimate determined based at least in part on said GNSS navigation data as being potentially manipulated, or (c) determine a manipulation risk level indicating a probability that said GNSS navigation data are manipulated and associate the manipulation risk level with said GNSS navigation data.

15. The apparatus according to claim 14, wherein the at least one memory and the computer program code with the at least one processor are further configured to cause the apparatus to:

obtain or hold available a representation of said reference position of said reference receiver.

16. The apparatus according to claim 14, wherein said GNSS navigation data are determined to be potentially manipulated if said distance between said reference position and said position estimate of said reference position exceeds a distance threshold.

17. The apparatus according to claim 14, wherein said GNSS navigation data contain at least one of ephemeris data of a GNSS satellite and clock data of said GNSS satellite, wherein said ephemeris data enable determining an orbital position of said GNSS satellite at a given time, and wherein said satellite clock data enable determining a deviation of a clock of said GNSS satellite from a GNSS system time at a given time.

18. The apparatus according to claim 14, wherein the at least one memory and the computer program code with the at least one processor are further configured to cause the apparatus to:

observe one or more GNSS signals at a position of said mobile device; and estimate said position of said mobile device at least partially based on said GNSS signals and said GNSS navigation data.

* * * * *